United States Patent [19]

Ferguson

[11] Patent Number: 4,978,321
[45] Date of Patent: Dec. 18, 1990

[54] BAFFLED AIR INTAKE SYSTEM FOR OUTBOARD MOTORS

[76] Inventor: Arthur R. Ferguson, 1620 Ferndale, Northbrook, Ill. 60062

[21] Appl. No.: 797,745

[22] Filed: Nov. 12, 1985

Related U.S. Application Data

[63] Continuation of Ser. No. 593,285, Mar. 26, 1984, abandoned.

[51] Int. Cl.$^5$ .............................................. B63H 21/00
[52] U.S. Cl. ................................... 440/88; 123/195 C
[58] Field of Search ..................... 440/77, 88; 114/211; 123/195 P, 195 E, 195 C; 55/185, 192

[56] References Cited

U.S. PATENT DOCUMENTS

| | | | |
|---|---|---|---|
| 2,798,470 | 7/1957 | Kiekhaefer | 123/198 |
| 2,815,742 | 12/1957 | Kiekhaefer | 123/198 |
| 2,839,042 | 8/1957 | Armstrong et al. | 123/198 |
| 2,914,133 | 11/1959 | Johnson | 181/53 |
| 3,195,530 | 5/1962 | Heidner | 123/198 |
| 3,204,619 | 7/1962 | Rubinowitz et al. | 123/74 |
| 3,557,902 | 1/1971 | Brown et al. | 181/35 |
| 3,610,198 | 10/1971 | Alexandrowicz | 115/17 |
| 3,712,416 | 1/1973 | Swanson et al. | 181/35 |
| 4,136,756 | 1/1979 | Kawamura | 181/229 |
| 4,326,600 | 4/1982 | Okazaki et al. | 181/229 |
| 4,348,194 | 9/1982 | Walsh | 440/77 |
| 4,379,702 | 4/1983 | Takada et al. | 440/77 |
| 4,403,471 | 9/1983 | Kobayashi | 440/88 |

FOREIGN PATENT DOCUMENTS

| | | | |
|---|---|---|---|
| 241400 | 1/1960 | Australia . | |
| 57-41291 | 3/1982 | Japan | 440/88 |

*Primary Examiner*—Joseph F. Peters, Jr.
*Assistant Examiner*—Clifford T. Bartz

[57] ABSTRACT

The outboard motor includes an engine driving a propeller. The engine cover includes an upper dome-like cover sealingly connected to a lower pan-like cover. A combustion air opening through the upper portion of said upper cover has a partition inside the opening requiring entering air to travel upwardly into a chamber between a baffle between the inside of the upper cover and the cover. The baffle includes a portion cooperating with the cover to define a downwardly directed duct leading air towards said lower cover clear of the engine. The engine draws combustion air from the region of the lower pan to a higher elevation at the front of the cover while entrained water is deposited in the lower cover a pump discharges the water.

18 Claims, 2 Drawing Sheets

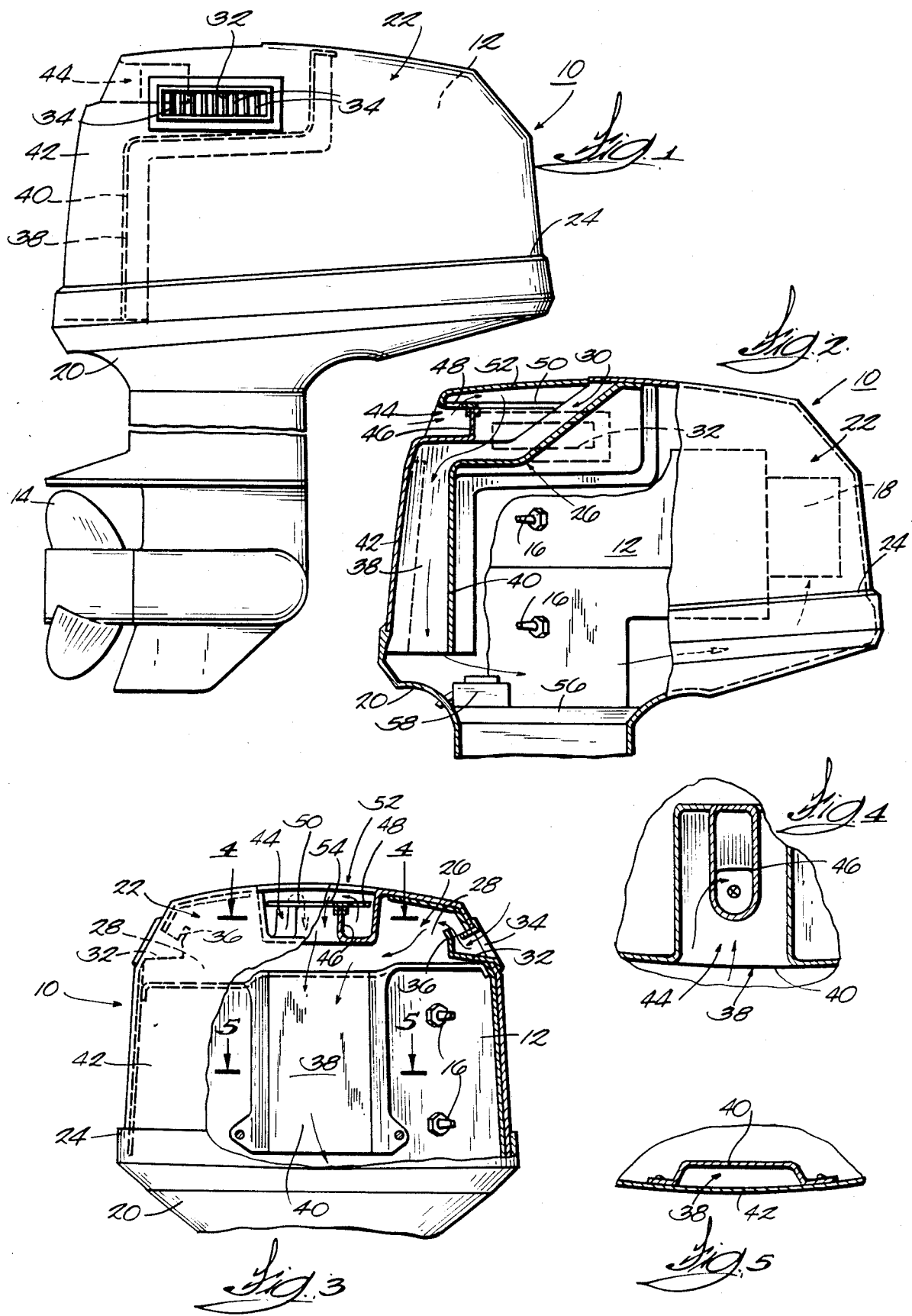

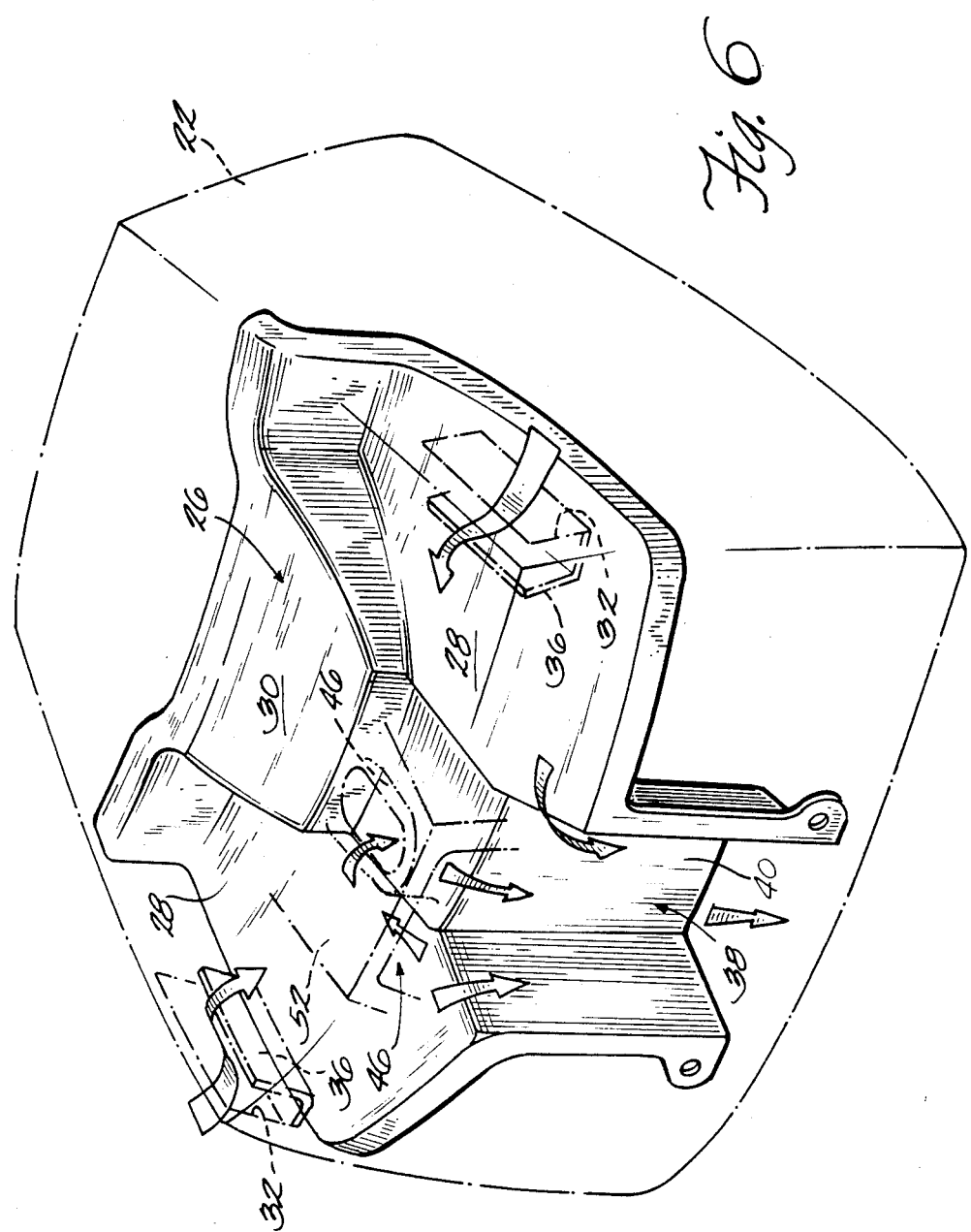

4,978,321

BAFFLED AIR INTAKE SYSTEM FOR OUTBOARD MOTORS

This application is a continuation of U.S. Pat. No. 593,285, now abandoned.

BACKGROUND OF THE INVENTION

Outboard motors are provided with covers designed to reduce the ingestion of water into the cylinder(s) of the engine. The water can be from rain, spray, heavy seas, etc. The cover also serves to reduce sound since the cover is customarily lined with sound absorbing material.

Even it the water does not get into the engine it can be a problem if it gets on the engine. This can lead to reduced spark ignition and when salt water evaporates it leaves a corrosive deposit. All told, it is desirable to keep the water out. The air intakes have been provided with vanes and with deflectors inside the opening. Under the right conditions water still gets in. The problem is magnified on large engines which need more combustion air. This requires larger openings into the cover which makes water and noise more of a problem.

This invention seeks to overcome such problems.

Attention is directed to the following prior art:

| | | |
|---|---|---|
| 2,798,470 | 3,195,530 | 3,610,198 |
| 2,815,742 | 3,204,619 | 4,136,756 |
| 2,839,042 | 3,557,902 | 4,326,600 |
| 2,914,133 | 3,712,416 | 4,379,702 |

SUMMARY OF THE INVENTION

This invention provides an air intake system for an outboard motor including an engine driving a propeller. The cover for the engine includes a lower pan-like cover and an upper dome-like cover sealingly connected to the lower cover. A combustion air opening is provided in the upper portion of the upper cover. A baffle cooperates with the inside of said upper cover to define a chamber. A combustion air opening communicates with the chamber and a partition between the opening and the chamber requires entering air to travel upwardly into said chamber. The baffle includes a portion cooperating with said upper cover to define a downwardly directed duct leading air towards said lower cover clear of said engine. Combustion air for the engine is drawn from the region of the lower pan to a higher elevation so water entrained in the air entering the opening and traveling down said duct will be deposited in the lower cover.

The invention further locates the duct adjacent the rear of the cover and while the air enters the engine adjacent the front of said cover.

Another feature is to provide in such a system an air opening at the rear of the cover and also an opening adjacent each upper rear corner of the cover, each such opening having a partition inside the opening requiring the air to flow upwardly to reach the chamber and duct while the partition returns to the outside entrained water deposited on the partition.

A further feature is the inclusion in such a system of means for discharging water which collects in the lower cover to the outside of the cover.

This invention is not limited to the details of construction and the arrangement of components set forth in the following description or illustrated in the drawings. The invention is capable of other embodiments and of being practiced and carried out in various ways. For example, the baffle is shown as fixed to the cover but it could be mounted on the engine and shaped to closely cooperate with the inside of the cover. Also it is to be understood that the phraseology and terminology employed herein is for the purpose of description and should not be regarded as limiting.

BRIEF DESCRIPTION OF THE DRAWINGS

FIG. 1 is a side elevation of an outboard motor in a somewhat schematic form to illustrate the side air inlets in the motor cover and also the baffle arrangement inside the cover.

FIG. 2 is a vertical section with parts broken away to show various features of the baffle arrangement.

FIG. 3 is a rear view of the upper portion of the power head of the outboard motor with parts broken away and other parts shown in dotted lines to illustrate the air flow to the engine.

FIG. 4 is a horizontal section taken as indicated by line 4—4 in FIG. 3.

FIG. 5 is a horizontal section taken as indicated by line 5—5 in FIG. 3.

FIG. 6 is an enlarged perspective view of the internal baffle arrangement with the cover and the ports in the cover ghosted in to give the relationship of the parts and the air flow path.

DETAILED DESCRIPTION OF THE DRAWINGS

The outboard motor has a power head 12 including a cover assembly 10 enclosing the engine which drives the propeller 14 through the conventional drive shaft and gearing. Spark plugs 16 are on the rear of the engine and the carburetor 18 is on the front of the engine. This is a conventional arrangement. The cover assembly 10 includes a lower pan-like cover 20 and an upper dome-like cover 22, which are sealingly connected at the joint 24. The upper cover is provided with an internal baffle 26 which is connected to and sealed with respect to the inside of the upper cover 22. As noted above the baffle could be fixed to the engine by suitable brackets or the like and still cooperate with the cover to provide all the features of the illustrated design.

The internal baffle 26 defines in combination with the inside of the upper cover an upper chamber which has what may be termed side chambers 28 in the upper rear corners of the cover. These side chambers 28 straddle a central sloping partition 30 which in cooperation with the sides of the baffle defines a space receiving the flywheel of the engine. A side air opening 32 opens to the chamber 28. The opening 32 is provided with a plurality of vertical louvers 34 and just inside the louvers there is an upwardly and inwardly projecting air deflecting partition 36. The partition projects above the opening 32 to force air coming into the opening to flow up under the domed cover before being turned downwardly by the cover into the duct 38 defined by the downwardly projecting portion 40 of the baffle 26 and the rear 42 of the cover 22.

The cover 22 is also provided with a rear opening 44 just above the duct 38. Air entering this opening must go around the chimney-like portion 46 of the cover and must rise up and pass through openings 48 in partition 50 which is part of an insert 52. Partition 50 also has a central opening 54 through which air coming in the rear opening 44 and openings 48 can pass downwardly through the chimney 46 and into the duct 38.

Thus, the air entering each side opening 32 is deflected upwardly into the side chambers 28 between the baffle and the cover. The air then passes down into the duct 38 leading down the rear of the cover. Air entering the upper rear opening 44 provided in the cover is drawn up through openings 48 surrounding the chimney 46 and then is turned downwardly through the opening 54 into the chimney 46 to flow into the space between the baffle and the cover to enter the downwardly facing duct 38. The duct 38 directs the air downwardly between the spark plugs 16. 16 on each side of the engine. The duct 38 opens into the lower pan-like cover 20 at the rear of the cover assembly. Now the combustion air flows to the front of the cover to go upwardly into the carburetors 18 which communicate with the cylinders of the engine.

Air entering either the rear opening or the side openings must flow upwardly in order to get into the central chamber between the baffle and the cover. Any entrained or windblown water tends to be thrown out by a change of direction In the case of the side openings, the partition 36 will then direct the water so deposited back out of the opening 32. Water entering the rear opening has to go up through the plate 50 and then is turned downwardly again into the chimney. Thus any water would tend to be deposited outside the chimney and it would then flow rearwardly away from the opening. Once inside the chamber between the cover and the baffle, the air has to flow downwardly along the rear of the cover and is kept away from the spark plugs and the engine itself. Thus, the incoming water cannot wet the exterior of the engine. The water changes direction at the bottom of the duct 38 and flows forwardly and entrained water will again tend to be thrown out of the air stream to collect on the bottom surface 56 of the lower pan-like cover 20. The air flows forward to be turned upwardly (throwing out more water) to the carburetor 18 and into the engine. All of this water collects at the bottom of the pan-like cover and can be discharged through the aspirator operated pump 58 as disclosed in U.S. Pat. No. 4,403,972, issued Sept. 13, 1983 or could be discharged through a suitable one-way or check valve arrangement.

The interior surfaces of the dome-like cover 22 are lined with soundproofing or sound absorbing material such as foam. The labyrinth or convoluted air flow path is also just as convoluted for transmission of sound. Therefore, there will be a reduced sound level outside the engine cover as compared to an engine having conventional openings without such a baffle arrangement. This arrangement accomplishes a considerable reduction in sound level.

The baffle requires any water entrained or blown into the openings to the cover to first travel upwardly before it even gets to the interior of the cover. Such water as manages to get past that change in direction is required to change direction again and flow down to the back of the bottom of the cover assembly for deposition while the air continues forward and then upward to the carburetor. Each turn drops out water and the water is then discharged outside the cover.

I claim:

1. An air intake system for a marine propulsion device including an engine having a top and driving a propeller, said air intake system comprising a cover for enclosing the engine, said cover including a lower pan-like cover member and an upper dome-like cover member sealingly connected to said lower cover member, said upper cover member including an upper portion having a combustion air opening therein, and a baffle including a portion cooperating with said upper cover member to define a downwardly directed duct communicating with said opening, being spaced horizontally from the engine, and extending below the top of the engine, whereby said duct leads air from said opening toward said lower cover member and clear of the engine so that water entrained in the air is deposited in said lower cover member and is substantially prevented from wetting the engine, and so that combustion air is drawn from the region of said lower cover member to the engine.

2. An outboard motor air intake system according to claim 1 wherein said baffle cooperates with said upper cover member to define a chamber communicating between said opening and the duct, and further including a partition located adjacent said opening and including wall means extending above said opening for directing upwardly air entering into said chamber from said opening.

3. An outboard motor air intake system according to claim 2 in which said cover member has a front and a rear and wherein said duct is adjacent said rear of said cover member and the air enters the engine adjacent said front of said cover member.

4. An outboard motor air intake system according to claim 3 in which said opening located at said rear of said cover.

5. An outboard motor air intake system according to claim 4 wherein said cover has upper rear corners, said air intake system further including an additional opening adjacent each of said upper rear corners of said cover, all of said openings being in communication with said chamber and said duct.

6. An outboard motor air intake system according to claim 2 wherein said upper cover member includes a front, a rear, and a pair of upper rear corners, one of said upper rear corners including said opening and the other of said upper rear corners including an additional opening, and a pair of partitions respectively associated with said openings, and wherein said duct leads downwardly from said chamber along said rear of said upper cover member and the engine draws combustion air from adjacent said front of said upper cover member.

7. An outboard motor air intake system according to claim 6 wherein said duct directs downwardly toward said lower cover member any water which enters said chamber, and further including means for discharging water which collects in said lower cover member to the outside of said cover.

8. An outboard motor air intake system according to claim 2 in which said partition is arranged to direct water entering said opening to return to the outside of said cover.

9. A cover for a marine propulsion device including an engine, said cover being adapted to close the engine and comprising a lower pan-like cover member and an upper dome-like cover member sealingly connected to said lower cover member, said upper cover member including an interior surface, a generally vertical exterior wall extending below the top of the engine, and an upper portion having therein a combustion air opening, and a baffle sealingly connected to said interior surface of said upper cover member and including a generally vertical portion spaced from and cooperating with said exterior wall of said upper cover member to define a downwardly directed duct, said duct communicating with said opening, being spaced horizontally from the engine, and extending below the top of the engine, whereby said duct leads air from said opening toward said lower cover member and clear of the engine so that water entrained in the air is deposited in said lower cover member and is substantially prevented from wetting the engine, and so that combustion air is drawn from the region of said lower cover member to the engine.

10. A cover according to claim 9 wherein said duct extends adjacent said lower cover member.

11. A cover according to claim 9 wherein said baffle cooperates with said upper cover member to define a chamber communicating between said opening and the duct, and wherein said system further includes a partition located adjacent said opening and including wall means extending above said opening for directing upwardly air entering into said chamber from said opening.

12. A cover according to claim 11 in which said partition is arranged to direct water entering said opening to return to the outside of said cover.

13. A cover according to claim 11 wherein said upper cover member includes a front, a rear, and a pair of upper rear corners, one of said upper rear corners including said opening and the other of said upper rear corners including an additional opening, and a pair of partitions respectively associated with said openings, and wherein said duct leads downwardly from said chamber along said rear of said upper cover member and the engine draws combustion air from adjacent said front of said upper cover member.

14. A cover according to claim 13 wherein said duct directs downwardly toward said lower cover member any water which enters said chamber, and wherein said system further includes means for discharging water which collects in said lower cover member to the outside of said cover.

15. A cover member according to claim 11 in which said cover has a front and a rear, and wherein said duct is adjacent said rear of said cover member and the air enters the engine adjacent said front of said cover member.

16. A cover according to claim 15 in which said opening is located at said rear of said cover.

17. A cover according to claim 16 wherein said cover includes a pair of upper rear corners, and wherein said system further includes an additional opening adjacent each of said upper rear corners of said cover, all of said openings being in communications with said chamber and said duct.

18. A marine propulsion device comprising a propulsion unit including a rotatably mounted propeller, and an engine drivingly connected to said propeller and including an air intake, and a cover enclosing said engine, said cover including a pan like lower cover member, and a dome-like upper cover member sealingly connected to said lower cover member, said upper cover member including a generally vertical exterior wall, an interior surface, and an upper portion having therein a combustion air opening, and a baffle sealingly connected to a generally vertical portion spaced from and cooperating with said exterior wall of said upper cover member to define a downwardly directed duct, said duct communicating with said opening, being spaced horizontally from said engine, and having a lower end located adjacent said lower cover member and below said air intake, whereby said duct leads air from said opening toward said lower cover member and clear of the engine so that water entrained in the air is deposited in said lower cover member and is substantially prevented from wetting said engine, and so that combustion air is drawn from the region of said lower cover member to said air intake.

* * * * *